J. P. SIMMONS.
CORN-DROPPER.

No. 191,723.   Patented June 5, 1877.

WITNESSES
E. H. Bates
George E. Upham

INVENTOR.
John P. Simmons.
Gilmore, Smith & Co.
ATTORNEYS.

UNITED STATES PATENT OFFICE.

JOHN P. SIMMONS, OF COLD SPRING, TENNESSEE, ASSIGNOR OF ONE-THIRD HIS RIGHT TO JAMES H. ACUFF, OF SAME PLACE.

IMPROVEMENT IN CORN-DROPPERS.

Specification forming part of Letters Patent No. 191,723, dated June 5, 1877; application filed April 21, 1877.

*To all whom it may concern:*

Be it known that I, JOHN P. SIMMONS, of Cold Spring, in the county of Bledsoe and State of Tennessee, have invented a new and valuable Improvement in Corn-Droppers; and I do hereby declare that the following is a full, clear, and exact description of the construction and operation of the same, reference being had to the annexed drawing, making a part of this specification, and to the letters and figures of reference marked thereon.

Figure 1:
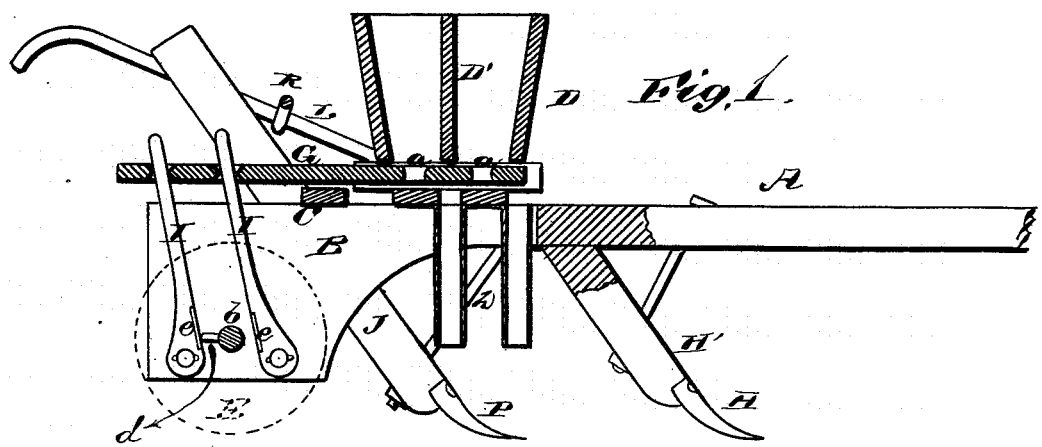
Figure 2:
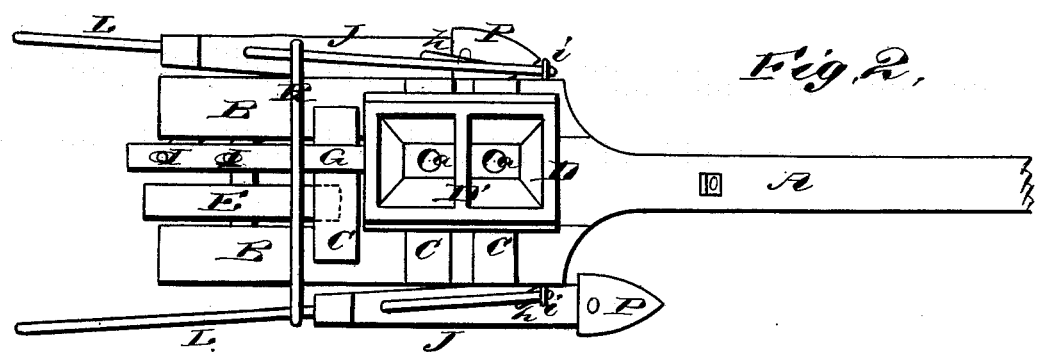

Figure 1 of the drawings is a representation of a longitudinal vertical part-sectional view of my corn-planter. Fig. 2 is a plan view of the same.

The nature of my invention consists in the construction and arrangement of a planter for dropping corn and beans or pease at the same time, but which may also be used for dropping either kind separately, as will be hereinafter more fully set forth.

In the annexed drawing, which fully illustrates my invention, A represents the beam to which the team is attached, and which has at its rear end two parallel beams, B B, attached to its sides, said side beams extending rearward for a suitable distance, and connected by top cross-bars C, as shown.

On top of these cross-bars is secured the hopper D, provided with a central vertical partition, D', which divides the hopper into two separate chambers, one intended for corn and the other for beans or pease.

Under the hopper D is a longitudinally-reciprocating slide, G, provided with dropping-apertures $a\ a$, and these apertures may have suitable devices for making them larger or smaller, so as to regulate the amount of seed dropped in each hill; and a suitable conductor or chute will be provided in a full-sized planter for conducting the seed to the furrow.

The side beams B B are at their rear ends enlarged on their under sides, as shown, and in these beams, near the rear ends, a shaft, $b$, has its bearings, on which shaft is secured a wheel, E, that runs directly behind the dropped seed in the furrow, and covers the same.

To the inner side of one of the beams B are pivoted two levers, I I, which extend upward, and have their upper ends rounded and passed through holes in the rear end of the dropping-slide G. These levers are located one in front and the other in rear of the shaft $b$, and they are pivoted to the beam B below said shaft. The levers are operated by means of a lug or flange, $d$, on the shaft $b$, which, when the shaft is rotating, alternately strikes the two levers, and moves them alternately backward and forward, thereby giving the slide G a longitudinally-reciprocating motion.

At the point on each lever I where the lug or flange $d$ strikes the same is fastened a metal plate, $e$, to prevent wear of the levers.

It will thus be seen that for each revolution of the wheel E and shaft $b$ one hill of corn and one hill of beans or pease are dropped. If desired, any one kind may be dropped in both hills at each revolution, or one of the apertures $a$ in the slide may be closed, so as to only drop one hill for each revolution of the wheel.

The furrow for dropping the grain is opened by means of a shovel-plow, H, attached to a foot, H', which is fastened under the rear end of the beam A.

The land is laid off by means of shovels P, secured to beams or standards J, fastened one to the outside of each side beam B by a single pin or bolt, said standards extending also a suitable distance above the beams B.

In operation one shovel P follows the mark already made at the side of the planted furrow, or between the last planted row and the row that is being planted, while the other shovel P makes the mark on the outside of the row that is being planted.

Each standard J is, from near its lower end, by a rod, $h$, connected with an eye, $i$, on the side of the beam B, near the front end, and in said eye is also connected the handle L, which extends rearward through a hole or mortise in the upper end of the standard J, as shown.

The two handles L L are connected by a rod, R.

By this arrangement of the handles they are supported without the addition of the usual posts or frames attached to the beams, and at the same time they strengthen and sustain the marker-standards J J without additional braces.

What I claim as new, and desire to secure by Letters Patent, is—

1. The combination of the covering-wheel E, secured on the shaft $b$, the lug or flange $d$ on said shaft, the levers I I, pivoted one on each side below the shaft, and the longitudinally-reciprocating slide G, substantially as and for the purpose described.

2. The combination of the marker-shovels P P, standards J J, the handles L L, passing through the upper ends of the standards, and the connecting-rod R, substantially as and for the purpose described.

In testimony that I claim the above I have hereunto subscribed my name in the presence of two witnesses.

JOHN P. SIMMONS.

Witnesses:
A. M. PAYNE,
S. W. McREYNOLDS.